United States Patent Office 2,906,670
Patented Sept. 29, 1959

2,906,670

**PROCESS OF PRODUCING GIBBERELLIC ACID BY TWO STAGE CULTIVATION OF *GIBBERELLA FUJIKUROI***

Antony Borrow, Edward Garstang Jefferys, and Ian Stewart Nixon, all of Welwyn, England, assignors to Imperial Chemical Industries Limited, London, England, a corporation of Great Britain No Drawing. Application January 31, 1958
Serial No. 712,337

Claims priority, application Great Britain
February 5, 1957

9 Claims. (Cl. 195—36)

This invention relates to improved metabolic processes and more particularly it relates to metabolic processes used for the production of gibberellic acid.

Gibberellic acid is a plant growth stimulant obtainable from the culture filtrates of certain active strains of the mould *Gibberella fujikuroi* (*Fusarium moniliforme*). It is known to manufacture gibberellic acid by cultivating an active strain of *Gibberella fujikuroi* in a suitable stirred and aerated nutrient medium containing a source of carbon for example glucose, a source of nitrogen for example ammonium nitrate, certain metallic salts for example magnesium sulphate and potassium dihydrogen phosphate and traces of metals such as iron, copper, zinc, manganese and molybdenum. It is characteristic of this metabolic process that the acid is produced for the most part when net protein synthesis or active growth of the mould has been checked. This check in active growth may be the result of exhaustion of one of the essential constituents of the nutrient medium for example nitrogen or carbon.

We have now found, and herein lies our invention, that improved rates of production of gibberellic acid may be obtained by carrying out the cultivation of the mould in two or more stages, the first stage being one of active growth of the mould and the final stage being one in which active growth is checked and gibberellic acid is produced. Where intermediate stages are involved, i.e. in three or more stage processes, these intermediate stages are stages of active growth.

The medium used in the first and any other active growth stage contains nutrients in amounts adequate for active growth of the mycelium i.e. it is a balanced medium, and in the final stage the medium is unbalanced in respect of one or more nutrients, preferably nitrogen, so as to check active growth of the mould and thereby promote production of gibberellic acid.

Preferably the unbalanced medium used in the final stage is of a high carbon/nitrogen ratio, i.e. higher than the ratio in which carbon and nitrogen are used up by the mould during active growth, so that active growth of the mould is checked by exhaustion of nitrogen, carbon then still being available to satisfy the requirement of the mould during gibberellic acid production.

A medium suitable for the active growth stage or stages is one containing sources of carbon (e.g. a sugar for example sucrose or glucose or a polyhydric alcohol for example glycerol), nitrogen (e.g. an ammonium salt, a nitrate, corn steep liquor or a digest of protein such as peptone or other sources containing assimilable nitrogen), magnesium, sulphur (which may conveniently be magnesium sulphate), potassium, phosphorous (which may conveniently be potassium dihydrogen phosphate) and traces of such metals as iron, copper, zinc, manganese and molybdenum. The concentration of nitrogen in the medium may be within the range of 0.017–0.25% w./v. for example in the form of 0.05–0.75% w./v. of ammonium nitrate and preferably within the range of 0.07–0.17% w./v. of nitrogen for example in the form of 0.2–0.5% w./v. of ammonium nitrate. The concentration of carbon for example in the form of a sugar such as sucrose, glucose or a polyhydric alcohol such as glycerol is then chosen so that there is a so-called balanced medium for active growth of the mould i.e. the ratio of the concentration of carbon to nitrogen preferably lies between the values of 10:1 and 25:1. A typical balanced medium suitable for active growth may contain 0.24% w./v. of ammonium nitrate and 3.18% w./v. of glucose monohydrate i.e. a ratio of C:N of 14:1 or it may contain 0.48% w./v. of ammonium nitrate and 10% w./v. of glucose monohydrate i.e. a ratio of C:N of 21:5.

In the preferred unbalanced medium of high carbon: nitrogen ratio in which active growth is checked and gibberellic acid is produced, a suitable C:N range is from 25:1 to 200:1. The choice of concentration of nitrogen in the medium will depend on the amount of active growth which is required to take place before it is checked by exhaustion of the nitrogen. A certain amount of active growth is desirable at the beginning of the gibberellic acid production stage to make full use of the fermenter capacity and a suitable nitrogen content in the unbalanced medium is from 0.04–0.17% w./v. for example in the form of 0.11–0.5% w./v. of ammonium nitrate.

A more preferred C:N range is of the order of 30:1 to 55:1 and on the basis of a nitrogen content in the unbalanced medium of from 0.04–0.17% w./v., the corresponidng content of carbon in the said medium is from 1.2–9.4% w./v. A suitable source of nitrogen to produce this desirable concentration of nitrogen may be for example 0.11–0.5% w./v. of ammonium nitrate and a suitable source of carbon to provide the desirable concentration of carbon may be for example 3.3–26% w./v. of glucose monohydrate. With the exception of carbon and nitrogen, the concentrations of the other nutrients may be similar to those used in an active-growth stage balanced medium.

Particularly valuable concentrations of carbon, for example in the form of glucose monohydrate, and nitrogen, for example in the form of ammonium nitrate, are as follows:

| Concentration of glucose monohydrate, percent w./v. | Concentration of carbon, percent w./v. | Concentration of ammonium nitrate, percent w./v. | Concentration of nitrogen, percent w./v. | Ratio, C:N |
|---|---|---|---|---|
| 11.11 | 4.0 | 0.24 | 0.084 | 47.6 |
| 8.0 | 2.88 | 0.24 | 0.084 | 34.3 |
| 12.6 | 4.54 | 0.36 | 0.126 | 36.0 |
| 20 | 7.2 | 0.4 | 0.14 | 51.4 |
| 12 | 4.32 | 0.3 | 0.105 | 41.1 |
| 10 | 3.6 | 0.24 | 0.084 | 42.9 |
| 5.5 | 1.98 | 0.12 | 0.042 | 47.1 |
| 20 | 7.2 | 0.44 | 0.154 | 46.8 |

An object of carrying out the metabolic production of gibberellic acid in two or more stages is to cultivate as quickly and as economically as possible balanced mycelium which may then be used for gibberellic acid production. This may be achieved by growing the mycelium in conditions in which the rate of growth is rapid, this mycelium then being used to inoculate a much larger volume of unbalanced "acid production" medium thus economising in fermenter capacity during the unproductive active growth period.

In addition, however, we have found that in a multi-stage process the mycelium in the unbalanced "acid production" stage produces acid at a higher rate than is the case if the mycelium is cultivated in the same unbalanced medium in a single stage process as is illustrated in Example 1.

During the course of the fermentation in the production of gibberellic acid i.e. the acid production stage in the unbalanced medium, the ingredient used as a source of carbon for example glucose may be added in portions after certain periods of time in order to maintain a certain concentration of carbon for example in the form of from 2 to 10% w./v. of a sugar for example glucose within the nutrient medium and thus promote the formation of increased amounts of gibberellic acid as described in our co-pending application No. 712,338.

The invention is illustrated but not limited by the following examples:

EXAMPLE 1

In a two-stage process the first stage was carried out in a fermenter containing 30 litres of a medium containing:

Glucose monohydrate _____ 10% w./v.
Ammonium nitrate _____ 0.48% w./v.
Potassium dihydrogen phosphate _____ 0.5% w./v.
Magnesium sulphate heptahydrate _____ 0.1% w./v.
Minor element concentrate [1] _____ 0.2% v./v.

[1] The composition of the minor element concentrate is as follows:
   Ferrous sulphate heptahydrate _____ gm.___ 0.1
   Copper sulphate pentahydrate _____ gm.___ 0.015
   Zinc sulphate heptahydrate _____ gm.___ 0.1
   Manganese sulphate heptahydrate _____ gm.___ 0.01
   Potassium molybdate (K$_2$MoO$_4$) _____ gm.___ 0.01
   Water _____ ml.__ 100

The medium was inoculated with an active strain of *Gibberella fujikuroi* (samples deposited in the culture collections of the Commonwealth Mycological Institute, Kew, the Bureau voor Schimmelcultures, Baarn and the Northern Utilisation Research and Development Division of the United States Department of Agriculture, Peoria, Illinois, U.S.A.) and was maintained at a temperature of 26.2° C. with an air flow of 15 litres/minute until the mycelium had grown to a dry weight of 16 mg./litre. This stage was reached in 100 hours.

3 litres of this aerated culture were then used to inoculate 30 litres of a second stage medium containing:

Glucose monohydrate _____ 20% w./v.
Ammonium nitrate _____ 0.24% w./v.
Potassium diyhdrogen phosphate _____ 0.5% w./v.
Magnesium sulphate heptahydrate _____ 0.1% w./v.
Minor element concentrate [1] _____ 0.2% v./v.

[1] The composition of the minor element concentrate is that given above.

Cultivation was continued in this medium at a temperature of 26.2° C. with an air flow of 15 litres/minute.

As a comparison a single stage process inoculated from the agar slope was run in a medium identical with the above second stage medium and under the same conditions of temperature and air flow.

The following table shows the gibberellic acid concentrations (corrected for evaporation) in the two media as cultivation proceeds:

*Gibberellic acid mg./litre*

| Age (hours after inoculation) | Single stage process | 2-stage process—second stage |
|---|---|---|
| 48.4 | | Nil |
| 66.0 | | 21 |
| 89.6 | | 63 |
| 115.8 | | 108 |
| 138.3 | | 151 |
| 141.9 | Trace | |
| 166.0 | 19 | |
| 185.7 | | 169 |
| 189.6 | 35 | |
| 215.8 | 60 | |
| 234.4 | | 273 |
| 238.3 | 72 | |
| 285.7 | 127 | |
| 305.8 | | 353 |
| 334.4 | 160 | |
| 401.7 | | 413 |
| 405.8 | 218 | |
| 501.7 | 308 | |

The table clearly shows—
(i) That when acid production commences the rate of production is higher in the second stage of the two stage process than in the single stage process, and
(ii) That when allowance is made for the fact that the first stage produces sufficient mycelium to inoculate ten second stage batches the initial growth phase in terms of fermenter capacity hours is much lower than in the single stage process.

EXAMPLE 2

*Preparation of inoculum*

In a 250 gallon fermenter vessel, a nutrient medium is prepared of the following composition:

Glucose monohydrate_____ 12% w./v.
Ammonium nitrate_____ 0.48% w./v.
Magnesium sulphate heptahydrate_____ 0.1% w./v.
Potassium dihydrogen phosphate_____ 0.5% w./v.
Minor element concentrate [1]_____ 0.2% v./v.
Water to make up to 100 gallons.

[1] The composition of the minor element concentrate is that given in Example 1.

This nutrient medium is sterilised and then cooled and inoculated with a bran culture of *Gibberella fujikuroi*. The medium is stirred and maintained at a temperature of 26° C. and is aerated with an air flow of 0.5 volume of air per volume of culture medium per minute for 66.5 hours. A thick mycelial growth develops and this is then used for the inoculation of the production fermentations. Analysis shows that the nitrogen content of the medium is then nearly exhausted.

*Production fermentation*

In a 250 gallon fermenter vessel, a nutrient medium is prepared of the following composition:

Glucose monohydrate _____ 12% w./v.
Ammonium nitrate_____ 0.3% w./v.
Magnesium sulphate heptahydrate_____ 0.1% w./v.
Potassium dihydrogen phosphate_____ 0.5% w./v.
Minor element concentrate [1]_____ 0.2% v./v.
Water to make up to 145 gallons.

[1] The composition of the minor element concentrate is that given in Example 1.

The medium is sterilised and then cooled and inoculated with 15 gallons of the inoculum described above. The medium is stirred and maintained at a temperature of 26° C. and is aerated with an air flow of 0.5 volume of air per volume of culture medium per minute. The following table shows the concentration of gibberellic acid in the medium as fermentation proceeds:

| Age (hours after inoculation): | Gibberellic acid (mg./litre) |
|---|---|
| 49 | 43 |
| 74 | 124 |
| 78 | 238 |
| 122 | 348 |
| 145 | 394 |
| 167 | 386 |
| 194 | 436 |
| 218 | 362 |

The fermenter contents are then filtered and the filtrate (600 litres) is extracted with ethyl acetate to remove gibberellic acid which is then recovered by means known to the art for example by concentration and purification by crystallisation. There is thus obtained 204.1 gm. of gibberellic acid as a colourless crystalline powder, M.P. 233–235° C. with decomposition.

EXAMPLE 3

The process described in Example 2 is repeated except that the 12% w./v. of glucose monohydrate and the 0.3% w./v. of ammonium nitrate in the nutrient medium used for the production fermentation are replaced by 10% w./v. of glucose monohydrate and 0.24% w./v. of ammonium nitrate. The following table shows the concentration of gibberellic acid in the medium as fermentation proceeds:

| Age (hours after inoculation): | Gibberellic acid (mg./litre) |
|---|---|
| 49 | 52 |
| 74 | 119 |
| 98 | 226 |
| 122 | 336 |
| 145 | 324 |
| 167 | 332 |

The fermenter contents are then filtered and the filtrate (577 litres) is extracted with ethyl acetate to remove gibberellic acid which is then recovered by means known to the art for example by concentration and purification by crystallisation. There is thus obtained 140.8 gm. of gibberellic acid as a colourless crystalline powder, M.P. 233–235° C. with decomposition.

EXAMPLE 4

The process described in Example 2 is repeated except that the 12% w./v. of glucose monohydrate and 0.3% w./v. of ammonium nitrate in the nutrient medium used for the production fermentation are replaced by 12.6% w./v. of glucose monohydrate and 0.36% w./v. of ammonium nitrate. The following table shows the concentration of gibberellic acid in the medium as fermentation proceeds:

| Age (hours after inoculation): | Gibberellic acid (mg./litre) |
|---|---|
| 108 | 30 |
| 132 | 80 |
| 156 | 158 |
| 177 | 246 |
| 201 | 298 |
| 225 | 370 |
| 249 | 390 |

The gibberellic acid can be isolated by any means known to the art for example by the method as described at the end of Example 2.

EXAMPLE 5

The process described in Example 2 is repeated except that the 12% w./v. of glucose monohydrate and 0.3% w./v. of ammonium nitrate in the nutriant medium used for the production fermentation are replaced by 11.11% w./v. of glucose monohydrate and 0.24% w./v. of ammonium nitrate. The following table shows the concentration of gibberellic acid in the medium as fermentation proceeds:

| Age (hours after inoculation): | Gibberellic acid (mg./litre) |
|---|---|
| 132 | 66 |
| 156 | 100 |
| 177 | 158 |
| 225 | 270 |
| 249 | 292 |
| 273 | 320 |
| 296 | 368 |

The gibberellic acid can be isolated by any means known to the art for example by the method as described at the end of Example 2.

EXAMPLE 6

An inoculum is prepared by the process as described at the beginning of Example 1 and is then used for the second production stage as described below.

*Production fermentation*

A nutrient medium is prepared of the following composition:

| | |
|---|---|
| Glucose monohydrate | 16% w./v. |
| Ammonium nitrate | 0.4% w./v. |
| Potassium dihydrogen phosphate | 0.5% w./v. |
| Magnesium sulphate heptahydrate | 0.1% w./v. |
| Minor element concentrate [1] | 0.2% v./v. |
| Water to make up to 75 litres. | |

[1] The composition of the minor element concentrate is that given in Example 1.

The medium is sterilised and then cooled and inoculated with 2.5 litres of the inoculum described above. The medium is stirred and maintained at 26° C. and is aerated with an air flow of 0.5 volume of air per volume of culture medium per minute. The following table shows the concentration of gibberellic acid in the medium as fermentation proceeds:

| Age (hours after inoculation): | Gibberellic acid (mg./litre) |
|---|---|
| 75 | 10 |
| 88 | 42 |
| 93 | 60 |
| 100 | 88 |
| 111 | 107 |
| 136 | 198 |
| 148 | 206 |
| 160 | 253 |

The gibberellic acid can be isolated by any known means for example by the method as described at the end of Example 2.

EXAMPLE 7

An inoculum is prepared by the process as described at the beginning of Example 1 and is then used for the second production stage as described below.

*Production fermentation*

A nutrient medium is prepared of the following composition:

| | |
|---|---|
| Glucose monohydrate | 20% w./v. |
| Ammonium nitrate | 0.4% w./v. |
| Potassium dihydrogen phosphate | 0.5% w./v. |
| Magnesium sulphate heptahydrate | 0.1% w./v. |
| Minor element concentrate [1] | 0.2% v./v. |
| Water to make up to 75 litres. | |

[1] The composition of the minor element concentrate is that given in Example 1.

The medium is sterilised and then cooled and inoculated with 2.5 litres of the inoculum described above. The medium is stirred and maintained at 26° C. and is aerated with an air flow of 0.5 volume of air per volume of culture medium per minute. The following table shows the concentration of gibberellic acid in the medium as fermentation proceeds:

| Age (hours after inoculation): | Gibberellic acid (mg./litre) |
|---|---|
| 82 | 6 |
| 106 | 46 |
| 118 | 79 |
| 130 | 133 |
| 142 | 138 |
| 154 | 229 |

The gibberellic acid can be isolated by any known means for example by the method as described at the end of Example 2.

What we claim is:

1. Process for the production of gibberellic acid which comprises carrying out the cultivation of the mould *Gibberella fujikuroi* (*Fusarium moniliforme*) in at least two stages, the first and any intermediate stages being stages of active growth of the said mould in a balanced medium containing a source of carbon and nitrogen, and the final stage being carried out in an unbalanced medium wherein the carbon/nitrogen ratio is higher than the ratio in which carbon and nitrogen are used up by the mould during active growth so that active growth is checked and gibberellic acid is produced.

2. Process as claimed in claim 1 wherein the concentration of nitrogen in the active growth stage is within the range of 0.017 to 0.25% w./v. and in the form of ammonium nitrate.

3. A process as claimed in claim 1 wherein the medium for the active growth stage as well as the gibberellic acid production stage contains sources of carbon, nitrogen, magnesium, sulphur, potassium and phosphorus, and traces of iron, copper, zinc, manganese and molybdenum.

4. Process as claimed in claim 2 wherein the ratio of carbon to nitrogen in the active growth stage, is within the range of 10.1 and 25.1.

5. Process as claimed in claim 2 wherein the sources of carbon and nitrogen are 3.18% w./v. of glucose monohydrate and 0.24% w./v. of ammonium nitrate.

6. Process as claimed in claim 1 wherein the unbalanced medium has a carbon/nitrogen ratio within the range of 25:1 to 200:1.

7. Process as claimed in claim 6 wherein the concentration of nitrogen is within the range of 0.04–0.17% w./v.

8. Process as claimed in claim 6 wherein the concentration of carbon is within the range of 1.2–9.4% w./v.

9. Process as claimed in claim 1 wherein the gibberellic acid production stage in the unbalanced medium is carried out such that the source of carbon is added in portions in order to maintain a certain concentration of carbon within the medium.

References Cited in the file of this patent

UNITED STATES PATENTS

| 1,849,053 | Bernhauer et al. | Mar. 15, 1932 |
| 2,394,031 | Waksman et al. | Feb. 5, 1946 |
| 2,842,051 | Brian et al. | July 8, 1958 |

OTHER REFERENCES

Stodola et al.: Arch. of Biochemistry, 54, January 1955, pp. 240–245.